United States Patent
Pare et al.

(10) Patent No.: US 9,184,916 B2
(45) Date of Patent: *Nov. 10, 2015

(54) SYSTEM AND METHOD FOR USING A STREAMING PROTOCOL

(71) Applicant: AOL Inc., Dulles, VA (US)

(72) Inventors: David F. Pare, San Francisco, CA (US);
David L. Biderman, San Jose, CA (US);
Stephen Loomis, Leesburg, VA (US);
Scott K. Brown, Marietta, GA (US);
Michael Wise, Washington, DC (US);
David Wexelblat, Vienna, VA (US);
Conor P. Cahill, Waterford, VA (US);
David S. Bill, San Francisco, CA (US)

(73) Assignee: AOL Inc., Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/094,744

(22) Filed: Dec. 2, 2013

(65) Prior Publication Data

US 2014/0089665 A1    Mar. 27, 2014

Related U.S. Application Data

(63) Continuation of application No. 12/576,784, filed on Oct. 9, 2009, now Pat. No. 8,634,552, which is a continuation of application No. 11/019,124, filed on Dec. 22, 2004, now Pat. No. 7,602,908.

(Continued)

(51) Int. Cl.
*H04L 29/06* (2006.01)
*H04K 1/04* (2006.01)

(Continued)

(52) U.S. Cl.
CPC ............ *H04L 9/3244* (2013.01); *H04L 9/0637* (2013.01); *H04L 9/08* (2013.01); *H04L 9/0844* (2013.01); *H04L 9/12* (2013.01)

(58) Field of Classification Search
None
See application file for complete search history.

(56) References Cited

U.S. PATENT DOCUMENTS 7,020,892 B2   3/2006   Levesque et al.
7,095,945 B1   8/2006   Kovacevic (Continued)

FOREIGN PATENT DOCUMENTS

GB         2353191 A       2/2001

OTHER PUBLICATIONS

Request for Comments 2755; "Security Negotiation for WebNFS;" A. Chiu, M. Eisler, B. Callaghan; Sun Microsystems; Jan. 2000 (13 pages).

(Continued)

*Primary Examiner* — Fatoumata Traore
(74) *Attorney, Agent, or Firm* — Finnegan, Henderson, Farabow, Garrett & Dunner LLP

(57) ABSTRACT

An initialization vector (IV) is employed to decrypt a block of a stream that has been encrypted with Cypher Block Chaining (CBC) encryption, without requiring decryption of previous blocks within the stream. For example, a listener who accesses a distribution point to retrieve encrypted content authenticates himself to an application server that regulates access to encrypted content on the distribution point, and responsively receives a key. The listener then requests access to a reference point within the encrypted content stream somewhere after its beginning (e.g., using preview clips). The distribution point relates the reference point to a corresponding block of the encrypted stream, and identifies an IV previously used for encryption of that block. The distribution point provides the associated encrypted block of content and the IV to the listener to enable mid-stream rendering of the encrypted content, without requiring the listener to decrypt previous blocks within the encrypted stream.

17 Claims, 5 Drawing Sheets

Related U.S. Application Data

(60) Provisional application No. 60/617,087, filed on Oct. 12, 2004, provisional application No. 60/553,559, filed on Mar. 17, 2004, provisional application No. 60/530,977, filed on Dec. 22, 2003.

(51) Int. Cl.
*H04L 9/32* (2006.01)
*H04L 9/12* (2006.01)
*H04L 9/08* (2006.01)
*H04L 9/06* (2006.01)

(56) References Cited

U.S. PATENT DOCUMENTS

| | | |
|---|---|---|
| 7,260,312 B2 | 8/2007 | Srinivasan et al. |
| 2001/0033656 A1 | 10/2001 | Gligor et al. |
| 2002/0124099 A1* | 9/2002 | Srinivasan et al. ............ 709/231 |
| 2002/0174366 A1 | 11/2002 | Peterka et al. |
| 2003/0123665 A1 | 7/2003 | Dunstan et al. |
| 2003/0177503 A1* | 9/2003 | Sull et al. ...................... 725/112 |
| 2003/0188320 A1 | 10/2003 | Shing |
| 2004/0045036 A1* | 3/2004 | Terasaki ........................ 725/116 |
| 2005/0013277 A1* | 1/2005 | Marque-Pucheu ........... 370/336 |
| 2005/0091491 A1* | 4/2005 | Lee et al. ...................... 713/167 |
| 2005/0100161 A1* | 5/2005 | Husemann et al. ........... 380/200 |
| 2006/0215988 A1 | 9/2006 | Tol et al. |

OTHER PUBLICATIONS

Written Opinion of the International Search Authority for corresponding International Application No. PCT/US2004/042857, mailed Jun. 17, 2005 (7 pages).

International Search Report for corresponding International Application No. PCT/US2004/042857, mailed Jun. 17, 2005 (1 page).

* cited by examiner

SYSTEM AND METHOD FOR USING A STREAMING PROTOCOL

CROSS-REFERENCE TO RELATED APPLICATIONS

This application is a continuation of U.S. patent application Ser. No. 12/576,784, filed on Oct. 9, 2009 (now allowed), which is a continuation of U.S. patent application Ser. No. 11/019,124, filed on Dec. 22, 2004 (now U.S. Pat. No. 7,602,908), which claims priority from U.S. Provisional Application No. 60/617,087, filed on Oct. 12, 2004, U.S. Provisional Application No. 60/530,977, filed on Dec. 22, 2003, and U.S. Provisional Application No. 60/553,559 filed on Mar. 17, 2004. The contents of the prior applications are incorporated herein in their entirety.

TECHNICAL FIELD

This application relates to providing content.

BACKGROUND

Communications networks, such as the Internet, provide access to a vast library of content. For instance, communications networks may be leveraged by media players on personal computers to access and render audio and video programming. The interactive nature of the content sources and communications networks enables many users to select, access, or leverage a specified content selection from the vast library of content at a time desired by the user.

While the communications networks may enable access to rich interactive programming, content owners have expressed concerns about improper and unauthorized reproduction of copyrighted works. These concerns are amplified by the lossless nature of digital reproduction, the impact of which may be compounded by distribution over the Internet using file sharing programs, and the availability of tools to engage in improper use by content recipients. Such concerns may dissuade some content owners who would otherwise consider making their content selections available, or limit the circumstances under which the content owners make the content selections available.

SUMMARY

Generally, access to encrypted content is enabled through the use of a key and a series of initialization vectors to encrypt an unencrypted stream of content into an encrypted stream of content that is structured with constituent blocks that each are associated with one of the initialization vectors used to encrypt the unencrypted stream. A secure listener is made able to obtain the key, and to request a particular portion of content. When requested, the particular portion of content is related to a corresponding initialization vector used for its encryption, and a distribution point is configured to provide the requesting secure listener with access to the requested content portion and to the corresponding initialization vector. In this process, however, the distribution point provides the secure listener with access to less than all of the initialization vectors used to encrypt unencrypted stream of content.

Implementations may include one or more of the following exemplary features. For instance, an application server may be used to provide the key to a broadcaster configured to use the key to encrypt the unencrypted stream, and the key may be provided to the secure listener in response to the secure listener authenticating on the server. The key may be received by the secure listener during an authentication process performed in advance of a listener request for the particular portion of content, in response to user authentication to an application or otherwise.

With each encrypted block, a corresponding initialization vector may be stored. And, the stored initialization vector may be identified and provided for each block of the encrypted stream that is communicated, with the initialization vectors forming an encrypted payload. Access to the encrypted payload may be enabled using a time code. For instance, a request may be received from a listener for a portion of the encrypted stream associated with the time code, the encrypted payload may be accessed using the time code, and the encrypted payload may be provided to the listener so that the listener may decrypt and access the encrypted stream beginning with the time code. Furthermore, the particular portion of content requested may be related to the corresponding initialization vector used for encryption thereof by referencing an aggregated collection of initialization vectors maintained for content within the encrypted stream.

The distribution point may be configured to provide a key indicator in a metadata message that indicates to the secure listener which key to use in decrypting the stream of blocks following the metadata message. The metadata message may be transmitted as an encryption metadata message, which may be identified with a 0x3902 label.

Listeners may be made able to request the particular portion of content by specifying a reference point at which initiation of content streaming is requested. Responsively, the distribution point may be configured to provide the secure listener with the initialization vector for a constituent block of the encrypted stream corresponding to content at the selected reference point, in a metadata message or otherwise. More particularly, for instance, the start point may be designated using a time code that relates the particular portion of content requested to the corresponding initialization vector used for encryption of the particular portion of content requested. Also, the secure listener may be provided with constituent blocks for portions of the encrypted stream that follow the selected reference point without providing the secure listener with corresponding initialization vectors for one or more of the constituent blocks for portions of the encrypted stream that follow the selected reference point.

Implementations of the described techniques may include hardware, a method or process, or computer software on a computer-accessible medium.

The details of one or more implementations are set forth in the accompanying drawings and the description below. Other features will be apparent from the description and drawings, and from the claims.

DETAILED DESCRIPTION

Figure 1:
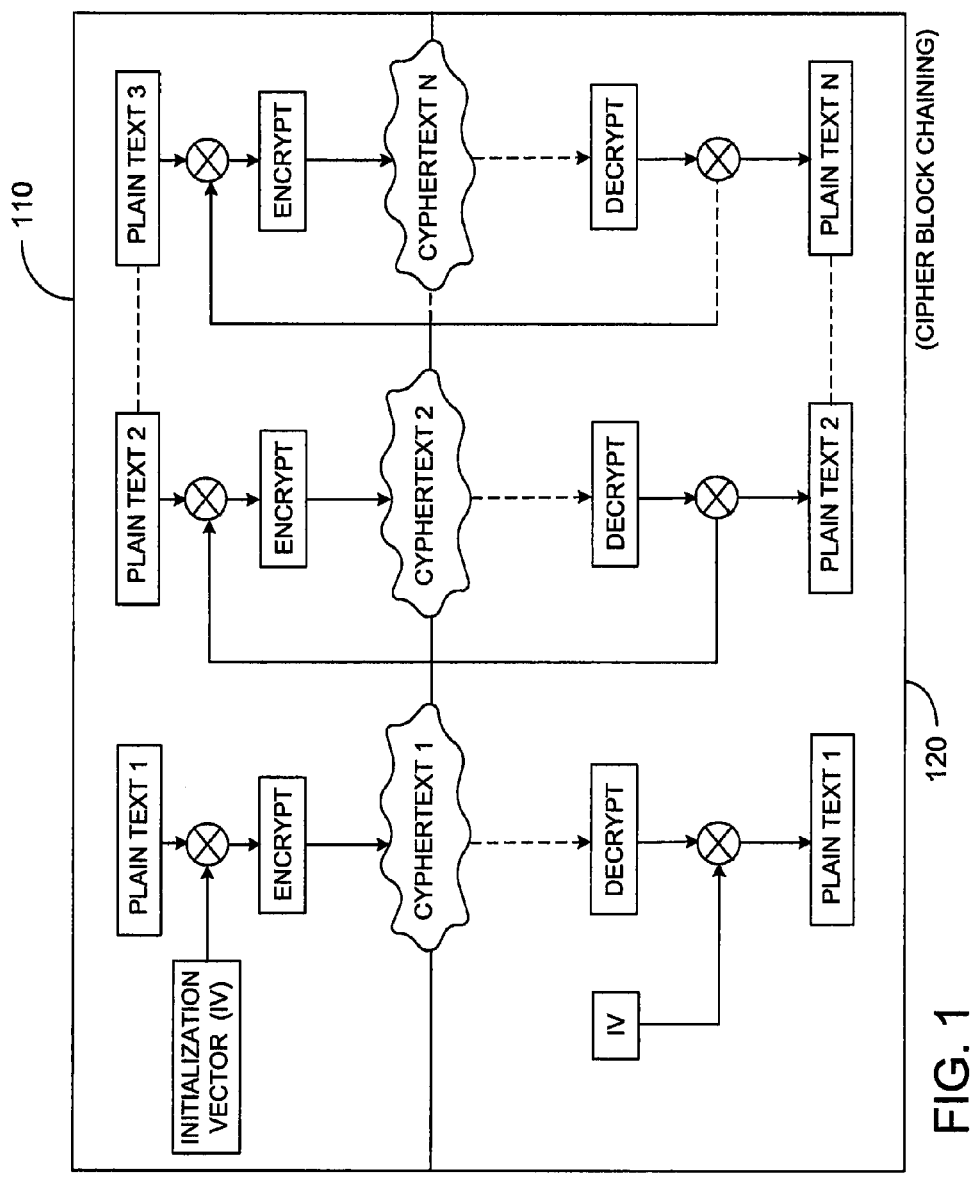
FIG. 1 is an exemplary block diagram of a cipher block chaining system used to encrypt and decrypt a content selection.

To combat improper use of content, content selections may be encrypted. Encrypting content selections may preclude some forms of exploitation. For example, encrypting content selections may preclude a packet 'sniffer' on a computer from capturing and reconstructing a "sniffed" stream with the content selection. Yet, while encrypting serves to address concerns of content selection owners, encrypting may introduce other problems. In particular, some forms of encryption, such as Cypher Block Chaining (CBC), are predicated upon having access to previously decrypted blocks of content to operate on a present block of content. Thus, decrypting a present block of content may require the decrypted results of previous blocks of content. Requiring the results of previous CBC operations may complicate the operation of on-demand systems because accessing a content selection midway would require a listener to receive and decrypt all of the preceding content. Such an operation would be cumbersome and inefficient.

To avoid these and other issues, a distribution point that enables access to on-demand content may be configured to provide an initialization vector (IV) that may be used in decrypting a block for which previous blocks have not been decrypted.

For example, a listener (e.g., a personal computer acting as a client) may be accessing a distribution point to retrieve online movies. Because the distribution point provides encrypted streams, the listener logs into an application server that regulates access to online movies on the distribution point. The application server is configured to authenticate listeners requesting access to the online movies, and provide a key in response. The listener then requests access to a movie on the distribution point. In particular, the listener requests access using a time code representing the halfway point of the movie, perhaps to resume viewing the movie where a user had previously stopped viewing the movie. The distribution point receives the time code, and identifies an associated encrypted block of content. The distribution point also retrieves an IV for the associated encrypted block of content. The distribution point provides the associated encrypted block of content and the IV to the listener. For example, the distribution point may provide the associated encrypted block of content as streaming content and provide the IV to the listener in accompanying metadata also used to provide content information (e.g., actor, film, artist, album, or song information).

The listener receives the IV and the associated encrypted block. The IV is loaded to the decryption block so that the associated encrypted block of content may be decrypted using the key and the IV. Put differently, providing the IV frees the listener of having to perform the decryption of previous blocks otherwise derived.

Moreover, on-demand programming may be enhanced to include 'trickplay' feature sets such as pause, fast forward, and rewind. In fact, on-demand users may be allowed to use a time code to access a content selection beginning at a specified time into the content selection. For example, a user may access a portion of a movie using 10:30 as a time code, that is, accessing the movie ten minutes thirty seconds into the movie.

FIG. 1 is an exemplary block diagram of a cipher block chaining system 100 (CBC system 100) used to encrypt and decrypt a content selection. CBC system 100 is described independent of the underlying devices in a communications system. A streaming media system may be configured to implement a CBC system 100 to distribute content in a secure manner.

In particular, encryption logic 110 is configured to encrypt N blocks of content beginning at plaintext block 1 and proceeding through plaintext block N. Plaintext block 1 is encrypted using an IV and a key (not shown) to generate cyphertext block 1. Cyphertext block 1 is used in the encryption of plaintext block 2. The "chaining" is continued on through plaintext block N.

Decryption block 120 begins by receiving cyphertext block 1 using a key (not shown) and the IV to generate plaintext block 1. The output of plaintext block 1 is used to decrypt cyphertext block 2. The decryption operations are repeated until cyphertext block N is decrypted.

Cyphertext block N may be decrypted in two manners. In a cumbersome implementation, the preceding N−1 blocks are decrypted to generate the inputs into the decryption operation. In another implementation, a distribution point distributes an IV for the preceding block of content so that the listener need not decrypt all preceding blocks.

Figure 2:
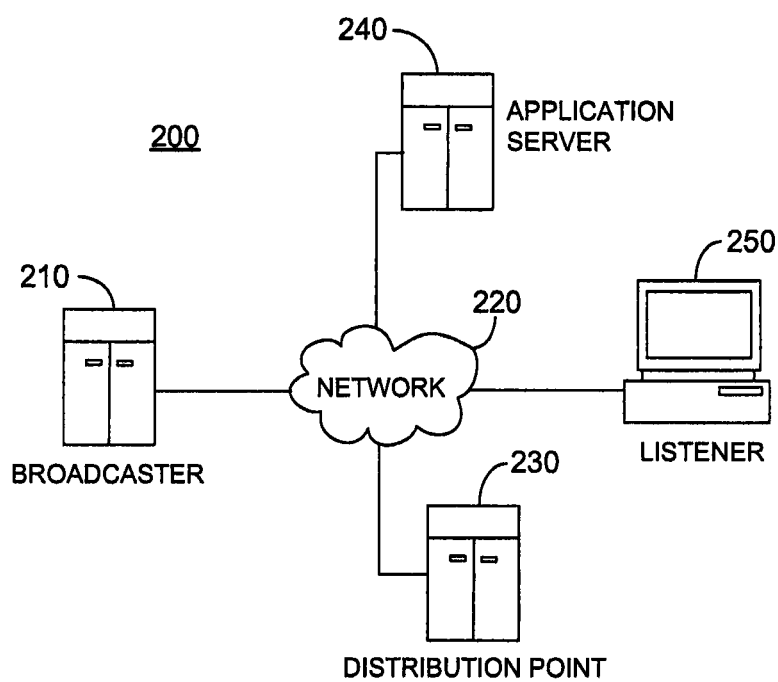
FIG. 2 is a block diagram of an exemplary communications system configured to distribute content using a streaming protocol.

FIG. 2 illustrates an exemplary communications system 200 configured to distribute content in a secure manner. For ease of discussion, particular components described with respect to FIG. 2 are referenced as performing the operations shown in flow chart 400. However, similar methodologies may be applied in other implementations where different components are used to define the structure of the system, or where the functionality is distributed differently among the components shown by FIG. 2.

Communications system 200 includes a broadcaster 210, a network 220, a distribution point 230, an application server 240, and a listener 250. The systems in communications system 200 are configured to use a streaming protocol to distribute and receive a stream. The broadcaster 210 may use a broadcaster component of the streaming protocol to distribute the stream to a distribution point 230. The distribution point 230 may use a listener component of the streaming protocol to distribute the stream to a listener 250.

The broadcaster 210 generally includes one or more devices configured to distribute digital content. For example, the broadcaster 210 may include a server or a duplicating switch.

Typically, a broadcaster 210 includes a collection or library of content for distribution. Alternatively, or in addition, the broadcaster may convert a media source (e.g., a video or audio feed) into a first feed of data units for transmission across the network 220. The broadcaster 210 may include a general-purpose computer having a central processor unit (CPU), and memory/storage devices that store data and various programs such as an operating system and one or more application programs. Other examples of a broadcaster 210 include a workstation, a server, a special purpose device or component, a broadcast system, other equipment, or some combination thereof capable of responding to and executing instructions in a defined manner. The broadcaster 210 also may include an input/output (I/O) device (e.g., video and audio input and conversion capability), and peripheral equipment such as a communications card or device (e.g., a modem or a network adapter) for exchanging data with the network 220.

The broadcaster 210 includes playlisting software configured to manage the distribution of content. The playlisting software organizes or enables access to content by a listener community. For example, the broadcaster 210 may be operated by an Internet radio station that is supporting a user community by streaming an audio signal, and may arrange a sequence of songs accessed by the user community.

The broadcaster 210 may include a duplicating switch (not shown). Generally, a duplicating switch includes a device that performs network operations and functions in hardware (e.g., in a chip or part of chip). In some implementations, the duplicating switch may include an ASIC ("Application Specific Integrated Circuit") that implements network operations logic directly on a chip (e.g., that includes gates fabricated on a silicon wafer and then manufactured into a chip). For example, an ASIC chip may perform filtering by receiving a packet, examining the IP address of the received packet, and filtering based on the IP address by implementing a gate structure in silicon.

Implementations of the device included in the duplicating switch may employ a Field Programmable Gate Array (FPGA). A FPGA is generally defined as including a chip or chips fabricated to allow a third party designer to implement a variety of designs on the chip. For example, a third party designer may load a FPGA with a design to replace the received IP addresses with different IP addresses, or may load the FPGA with a design to segment and reassemble IP packets as they are modified while being transmitted through different networks.

Implementations of the device included in the duplicating switch also may employ a network processor. A network processor is generally defined to include a chip or chips that allow software to specify which network operations will be performed. A network processor may perform a variety of operations. One example of a network processor may include several interconnected RISC ("Reduced Instruction Set Computer") processors fabricated in a network processor chip. The network processor chip may implement software to change an IP address of an IP packet on some of the RISC processors. Other RISC processors in the network processor may implement software that monitors which terminals are receiving an IP stream.

Although various examples of network operations were defined with respect to the different devices, each of the devices tends to be programmable and capable of performing the operations of the other devices. For example, the FPGA device is described as the device used to replace IP addresses and segment and reassemble packets. However, a network processor and ASIC are generally capable of performing the same operations.

The network 220 may include hardware and/or software capable of enabling direct or indirect communications between the broadcaster 210, the distribution point 230, and the listener 250. As such, the network 220 may include a direct link between the broadcaster and the listener, or it may include one or more networks or subnetworks between them (not shown). Each network or subnetwork may include, for example, a wired or wireless data pathway capable of carrying and receiving data. Examples of the delivery network include the Internet; the World Wide Web; a WAN ("Wide Area Network"); a LAN ("Local Area Network"); analog or digital wired and wireless telephone networks; radio, television, cable and satellite networks; and/or any other delivery mechanism for carrying data.

The distribution point 230 includes a device configured to receive content from a broadcaster 210 and distribute the content to one or more listeners 250. Generally, the distribution point 230 may include the server and/or duplicating switches described previously.

Typically, the application server 240 includes a system configured to authenticate a listener and perform key management operations. For example, a listener 250 may be required to authenticate with the application server before the listener 250 is enabled to access content loaded to a distribution point. The application server also may be configured to share keying information with a broadcaster and/or a device used to preencrypt content. For example, the application server 240 may specify a key that will be used for a particular distribution point, station, content selection, demographic, user, or configuration. The application server then may be configured to encrypt the specified content selection or enable another device to encrypt the content selection using a particular key. The particular key then may be provided to a user in response to authenticating. The application server 240 also may be configured to access IVs derived in the course of encrypting content. For example, the application server 240 may instruct a broadcaster 210 that is encrypting content to save the intermediary IVs. The application server 240 then may instruct the broadcaster 210 to provide the content to a distribution point 230.

The listener 250 may include one or more devices capable of accessing content on the distribution point 230. The listener 250 may include a controller (not shown) that processes instructions received from or generated by a software application, a program, a piece of code, a device, a computer, a computer system, or a combination thereof, which independently or collectively direct operations of the listener 250. The instructions may be embodied permanently or temporarily in any type of machine, component, equipment, storage medium, or propagated signal that is capable of being delivered to the listener 250 or that may reside with the controller of the listener 250. Listener 250 may include a general-purpose computer (e.g., a PC) capable of responding to and executing instructions in a defined manner, a workstation, a notebook computer, a PDA ("Personal Digital Assistant"), a wireless phone, a component, other equipment, or some combination of these items that is capable of responding to and executing instructions.

In one implementation, the listener 250 includes one or more information retrieval software applications (e.g., a browser, a mail application, an instant messaging client, an Internet service provider client, or an AOL TV or other integrated client) capable of receiving one or more data units. The information retrieval applications may run on a general-purpose operating system and a hardware platform that includes a general-purpose processor and specialized hardware for graphics, communications and/or other capabilities. In another implementation, listener 250 may include a wireless telephone running a micro-browser application on a reduced operating system with general purpose and specialized hardware capable of operating in mobile environments.

The listener 250 may include one or more media applications. For example, the listener 250 may include a software application that enables the listener 250 to receive and display an audio or video data stream. The media applications may include controls that enable a user to configure the user's media environment. For example, if the media application is receiving an Internet radio station, the media application may include controls that enable the user to select an Internet radio station, for example, through the use of "preset" icons indicating the station genre (e.g., country) or a favorite. In another example, the controls may enable the user to rewind or fast-forward a received media stream. For example, if a user does not care for a track on a particular station, the user may interface with a "next track" control that will queue up another track (e.g., another song).

The reference to a particular system as a broadcaster 210, a distribution point 230, or a listener 250, and the corresponding streaming protocol may depend on the relationship between a system of interest and the systems with which the system of interest is communicating. Although a common configuration may include using a server as a broadcaster 210 and a duplicating switch as a distribution point 230, a broadcaster component of the streaming protocol is not limited to being employed by a server and a listener component of the streaming protocol is not limited to being employed by a duplicating switch. For example, a three-tiered hierarchy of distribution may be used. A server configured to convert an analog audio signal into a stream may be used in a first tier. The second tier may include duplicating switches configured to receive the stream from the server in the first tier and to distribute the stream to duplicating switches in a third tier. The third tier may include duplicating switches configured to support a listener community through a cable distribution system. Thus, the server in the first tier uses a broadcaster component of the streaming protocol to provide the stream to the duplicating switches in the second tier. The duplicating switches in the second tier use the broadcaster component of the streaming protocol to receive the stream from the server in the first tier and also to provide the stream to the duplicating switches in the third tier. The duplicating switches in the third tier use the broadcaster component of the streaming protocol to receive the stream and use the listener component of the streaming protocol to distribute the stream to a listener.

Furthermore, a data store may be included in one or more of the broadcaster 210, the distribution point 230 or the application server 240, to maintain a relationship between constituent content blocks within an encrypted stream and corresponding initialization vectors therefore. Such a data store may also include reference to the key used in combination with the initialization vectors to encrypt each block or series of blocks, and it may be referenced when formulating responses to content requests received from listeners, particularly when responses require an indication of the stored initialization vector(s).

Figure 3:
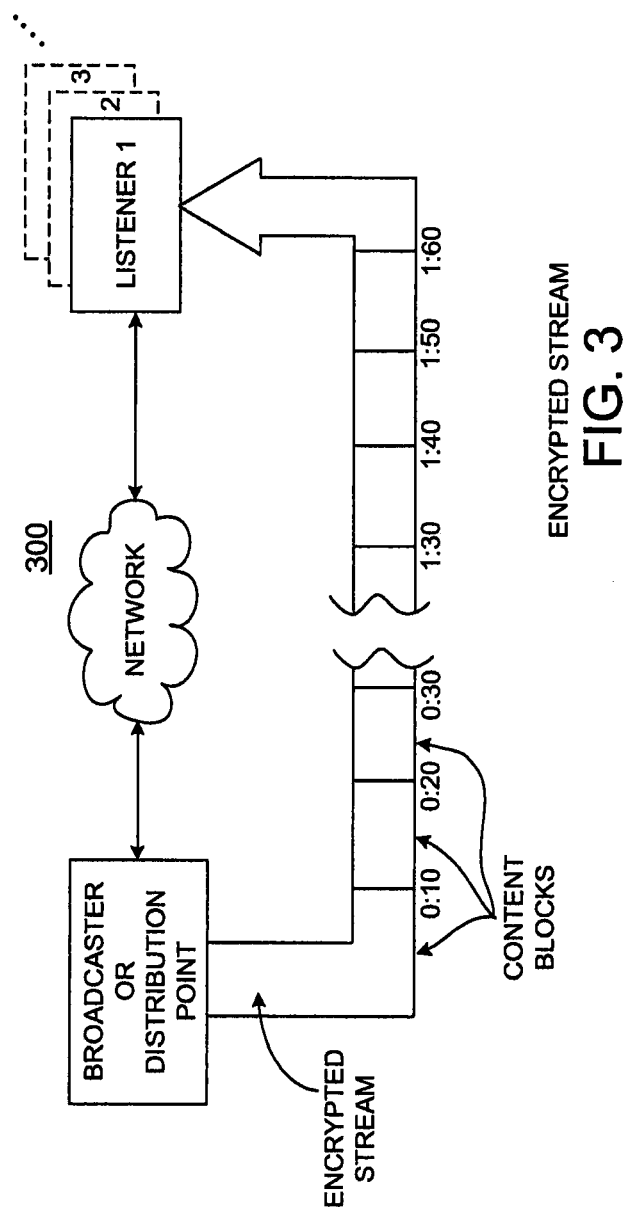
FIG. 3 illustrates an exemplary communications system configured to distribute content in a secure manner.

FIG. 3 illustrates a block diagram 300 of an exemplary structure by which a stream of content is accessed by using a time code. In particular, block diagram 300 illustrates that a sequence of blocks may be exchanged between a distribution point and a broadcaster. Each block of content is associated with a range of one or more time codes. For example, the first block of content is associated with a time code from the beginning of the content selection (e.g., 0:00) until the time boundary (e.g., 0:10). Similarly, the second block of content is associated with time codes from 0:10 to 0:20. The distribution point is configured to associate a received time code with a block of content.

Figure 4:
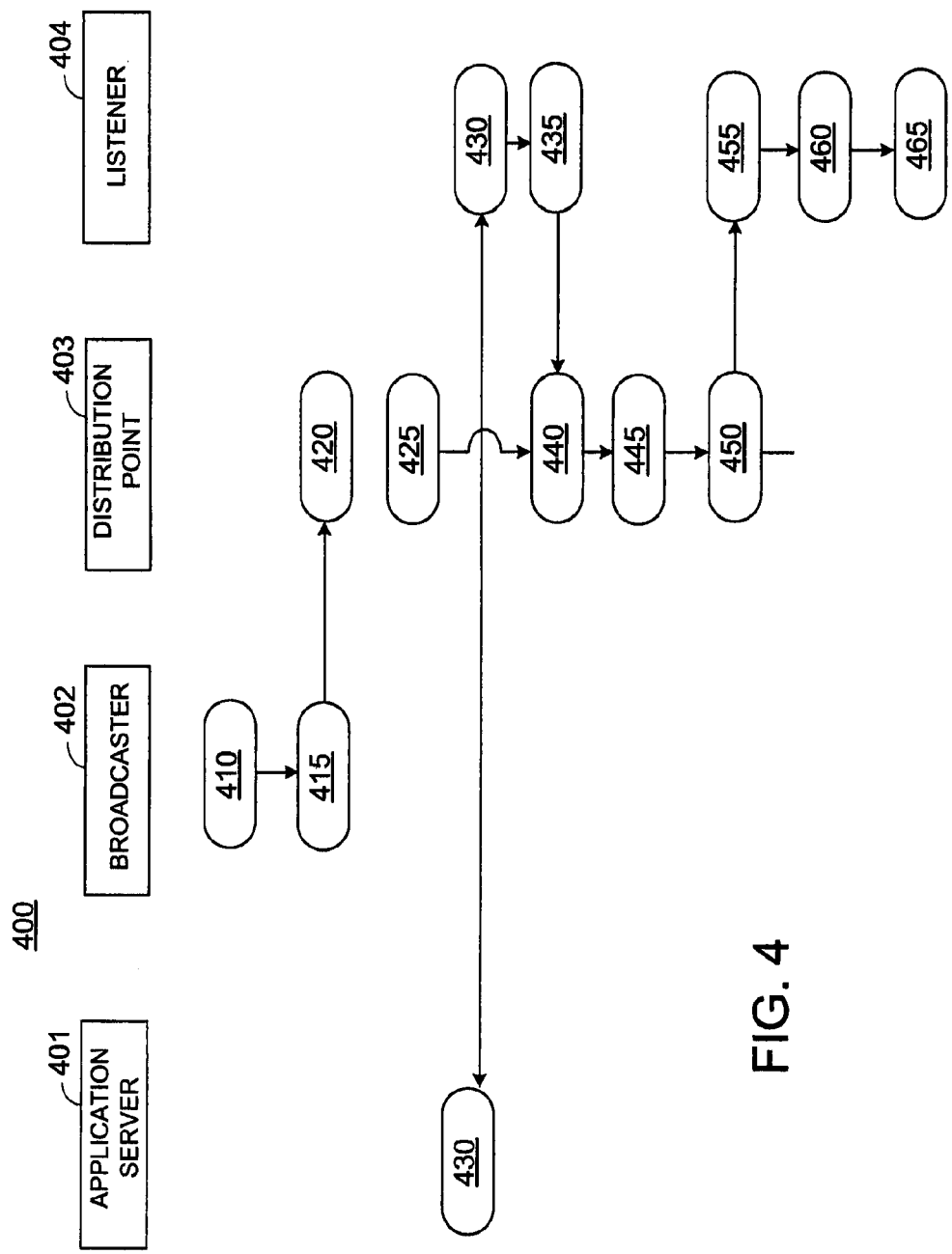
FIG. 4 is a flow chart of an exemplary process by which a distribution point provides a listener with access to an encrypted stream using a time code.

FIG. 4 is a flow chart 400 of an exemplary process by which a listener accesses encrypted content using a time code. For ease of discussion, particular components described with respect to FIG. 2 are referenced as performing the operations shown in flow chart 400. However, similar methodologies may be applied in other implementations where different components are used to define the structure of the system, or where the functionality is distributed differently among the components shown by FIG. 2.

Encryption operations may be computationally intensive tasks. Configuring a distribution point 403 to perform encryption on-the-fly may require additional processing cycles or hardware. The additional processing cycles may reduce performance (e.g., by increasing the latency), reduce the number of listeners that a distribution point may support, and/or reduce an ability of a distribution point 403 to respond to dynamic network conditions. Particularly where the distribution point 403 includes a duplicating switch, configuring the distribution point 403 to encrypt content may result in substantial challenges, particularly for Internet-sized audiences and/or implementations where encryption accelerators are not used. As a result, in some implementations, a broadcaster 402 encrypts a stream in advance (410). An IV is associated with each encrypted block representing the IV that should be provided to a listener 404 if the listener 404 provides a time code associated with the particular block (415). The encrypted stream of blocks and associated IVs are provided to the distribution point 403 (420). The distribution point 403 is configured to enable access to the encrypted stream in response to listener provided time codes (425). When the content has been encrypted in advance, the distribution point 403 may be configured to provide the stream as if unencrypted content was being provided with the exception that the IV also is provided for each encrypted block.

A listener 404 interfaces with an application server 401 to authenticate (430). In one example, interfacing with an application server 401 includes logging into an online service provider. In another example, interfacing with an application server 401 includes accessing a web page configured to act as a navigation gateway for content selections loaded to a distribution point 403. Interfacing with the application server 401 may include providing a screen name and password, and receiving a token and at least one key in response. The token may be configured to authorize a streaming session on behalf of a listener on a distribution point 403. The key may be used to decrypt an encrypted stream. Typically, the application server 403 provides symmetric keys due to the relative efficiency of symmetric key algorithms over asymmetric keys. However, asymmetric keys also may be used.

The listener 404 then generates a content request using a first time code (435). In response, the distribution point 403 receives the user request (440), identifies the encrypted block using the time code (445), and then forms a stream of messages, each of which contains its own IV and encrypted block (450). Thus, the distribution point 403 provides access to the encrypted content beginning with the encrypted content block associated with the listener-provided time code.

The listener 404 receives the stream of IV and the encrypted content blocks (455), and uses the IV associated with each block along with the key to decrypt each encrypted content block beginning with the time code (460). The listener 404 renders the content (465).

In one embodiment, before sending the message stream of encrypted blocks, the distribution point 403 transmits a key indicator (XXX) to the listener in a metadata message. Typically, metadata is used to provide labeling or extra-content information related to the primary content. For example, metadata may be used to provide station, album, artist, or song information. Using the metadata to provide the key indicator enables the distribution point 403 to take advantage of metadata feature sets in the distribution point 403. It is one way of providing an indication of which key to use to decrypt the stream.

Figure 5:
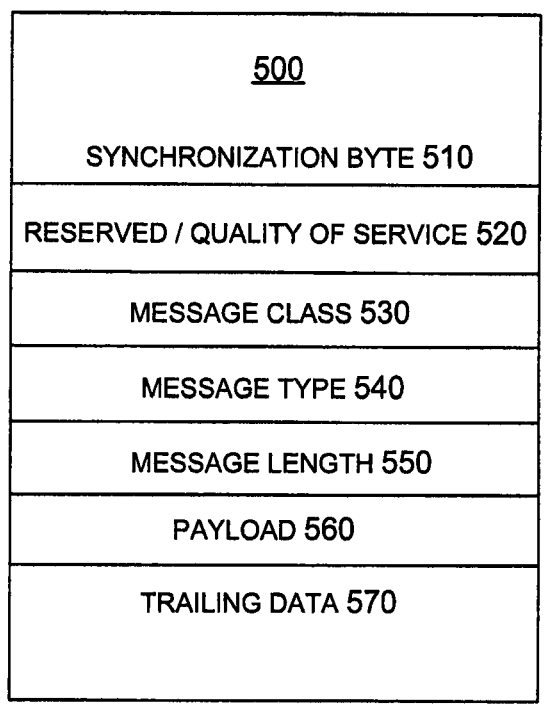
FIG. 5 is a block diagram of an exemplary messaging format for a media protocol.

FIG. 5 is a block diagram of an exemplary messaging format 500 for a streaming protocol. Messaging format 500 includes a synchronization byte 510, a reserved/quality of service field 520, a message class 530, a message type 540, a message length 550, a payload 560, and trailing data 570.

The synchronization byte 510 is used to indicate the beginning of a message. The synchronization byte 510 allows a listener to seek a potential valid frame if data gets corrupted between the distribution point and the listener.

The reserved field 520 may contain a collection of bits that, if set, indicate something about the message being transmitted. If bit zero is set, this specifies that the message contains a key frame (a term used by encoders to mark a place where rendering can start). If bit one is set, this specifies that the message is encrypted.

The message class 530 may be used in combination with the message type 540 to identify a message. Separating the unique identifier into two units may improve performance. More particularly, the message class 530 is labeled so that a distribution point may examine the message class and decide whether the distribution point needs to examine the payload 560. Examining the payload may require additional processing cycles for parsing on the part of the distribution point. This may result in adverse performance under a heavy load.

Exemplary message classes are shown in Table 1:

TABLE 1

| | Class | Description |
| --- | --- | --- |
| 0x0 | Operations | Not Presently Defined |
| 0x1 | Broadcaster | Broadcaster ⇔ Distrubution point This is used in messages between a broadcaster and a distribution point. |
| 0x2 | Listener | Distribution point ⇔ Listener This is used in messages between a distribution point and a listener. |
| 0x3 | Cacheable Metadata | Broadcaster → Listener via distribution point This is used in cacheable metadata messages between a broadcaster and a listener and may be cached at the distribution point. |
| 0x4 | Cacheable Metadata | Broadcaster → Listener via distribution point. This is used in cacheable metadata messages between a broadcaster and a listener and may be cached at the distribution point. |
| 0x5 | Pass-through Metadata | Broadcaster → Listener via distribution point. This is used in metadata messages between a broadcaster and a listener. |
| 0x6 | Pass-through Metadata | Broadcaster → Listener via distribution point. This is used in metadata messages between a broadcaster and a listener. |

Metadata may include information associated with a stream to be interpreted by the listener. Examples of metadata include Stream-Title, Stream-URL (Uniform Resource Locator) (web-site content related to the streamed content), Stream-Image (binary data), an IV, or other data descriptive of the stream. Metadata may flow over the same data path as stream data, for example, to prevent web proxies and firewalls from rejecting multiple data connections. The broadcaster may ensure that a stream is not saturated with excessive metadata. Saturating a stream with excessive metadata may create a poor listener experience that may be avoided by intelligent management of metadata.

Metadata may originate from a broadcaster and pass through the distribution point for handling by the listener. The metadata may be sent infrequently compared to the amount of stream data. For example, an audio stream may include a metadata message that indicates a change in the song title. If a listener subscribes to the stream just after the song-change metadata has passed, the listener may not know the name of the song being played until the next song change. Therefore, one implementation of the streaming protocol provides for two types of metadata, cacheable metadata and pass-thru metadata.

Cacheable metadata may be deemed more vital to a stream such that the listener always should have the most recent cacheable metadata. In contrast, pass-thru metadata is stream-associated data that is not as vital such that the listener may not mind waiting for the pass-thru metadata.

Cacheable metadata may require the distribution point to cache metadata messages and transmit the metadata messages when the listener connects. Therefore, a point in the stream buffer at which data is cached may coincide with a point where a listener is placed in the stream buffer on a listener connect. Cached metadata messages also may be included in the stream to the listener during normal streaming. Including cacheable metadata messages in the stream ensures that listeners have the most recent cached metadata both at the beginning of a streaming session and afterwards.

A package of metadata may be split into multiple messages. Put differently, multiple metadata messages of the same type and metadata ID may be combined and interpreted by a listener as a single piece of metadata. Similarly, the distribution point may need to understand the metadata sequencing in order to properly cache fragmented metadata. For a given message type, if a message is received whose index is already cached, the distribution point may remove all of the metadata messages that the distribution point has cached for that message type and then cache the new message.

The pass-through metadata messages may use the same form as cacheable metadata. However, the distribution point may treat pass-thru messages as data messages and transmit the pass-thru metadata messages directly to the listeners.

Typically, key indicators are distributed using cacheable metadata messages. In one implementation, streams are encrypted with at least two keys. In this embodiment, a key indicator metadata message is sent, followed by a stream of blocks encrypted using a key specified by the key indicator metadata. At some point, another key indicator metadata message is sent, followed by a stream of blocks encrypted using the key specified by the new key indicator metadata message. This allows a particularly long-lived stream to remain secure by changing keys at an appropriate frequency.

The message type 540 may include 12 bits in the message header that specify the type of data encapsulated in the message.

Exemplary message types for a broadcaster component of the streaming protocol are described later.

The message length 550 specifies the length of the payload following the message header. In the example shown, the message length 550 is the third byte and high four bits of the fourth byte of the message header (e.g., the synchronization byte 510, the reserve/flags field 520, the message class 530, a message type 540, and the message length 550). Note that in the example shown, the message length 550 does not include the trailing data 570 (e.g., an 0x00 byte).

The payload 560 includes the data for a message. Preferably, the size of the payload 560 is not restricted by the streaming protocol, however some implementations may set an implementation-dependent limit based on the size of the message length 550 field. Rather, the streaming protocol typically specifies how a broadcaster, a distribution point, and a listener negotiate and report the maximum size message that will be sent in a stream. Some implementations may require the message size to stay under a Maximum Transmission Unit (MTU), in which case the distribution point may enforce the MTU during negotiation of the maximum payload size.

The trailing data 570 (e.g., 0x00) in the payload 560 may be used to demark the end of a message and may be used by the listener to determine if a message is malformed.

Exchanging Encrypted Content Using the Streaming Protocol

Payloads in classes 3-15 may be encrypted using the streaming protocol. In particular, frames with the E bit (in the reserved/flags field, bit 1) set are encrypted. In one implementation, only the codec data is encrypted. In another implementation, both the metadata and codec data are encrypted. Encrypted payloads may be larger than unencrypted payloads.

The streaming protocol may be configured to assume that distribution points may be able to pre-encrypt and cache content. To facilitate this, and to accommodate various trick play features such as fast fwd and seek, the streaming protocol may be configured to assume the use of a Cipher Block Chaining (CBC)-style encryption algorithm together with an IV. Using CBC with an IV assigned to each block allows each individual frame to be decrypted on its own, while still providing a different encrypted block even if the data is identical.

CBC-style algorithms may require extra space for IVs. Typically, an IV is the same size as the encryption block size. In addition, since CBC algorithms require that all messages be a multiple of the block size, there may be padding bytes required. As a result, an exemplary encrypted payload is shown below:

```
+-+-+-+-+-+-+-+-+-+-+-+-+-+-+-+-+-+-+-+-+-+-+-+-+-+-+-+-+-+-+-+-+
~                  Initialization Vector (IV)                   ~
|                 (same size as encryption block size)          |
+-+-+-+-+-+-+-+-+-+-+-+-+-+-+-+-+-+-+-+-+-+-+-+-+-+-+-+-+-+-+-+-+
|                                                               |
~                     Encrypted Payload Data                    ~
|                                                               |
+-+-+-+-+-+-+-+-+-+-+-+-+-+-+-+-+-+-+-+-+-+-+-+-+-+-+-+-+-+-+-+-+
|          ... Padding                        |   Pad Length    |
+-+-+-+-+-+-+-+-+-+-+-+-+-+-+-+-+-+-+-+-+-+-+-+-+-+-+-+-+-+-+-+-+
```

Some useful RFCs that discuss how CBC encryption works with variable length messages (such as IP datagrams) include RFC 1829 and RFC 3602.

Note that if a distribution point actually provides on-the-fly encryption, the distribution point may take into account the maximum increase in payload size, and inform broadcasters that the distribution point may only accept a payload of max-Payload−2*blocksize.

The encryption used by the streaming protocol may be configured to assume that keys can be uniquely identified by a key identifier. In one embodiment, this key identifier is a KeyBlock GUID+index. KeyBlocks are identified by GUID, and may contain many different keys. The specific key in the KeyBlock is identified by the index. A new cacheable metadata message, (e.g., the 0x3902 message), includes XML code that that uniquely identifies the key used to encrypt the stream. An exemplary structure of the XML code is shown below.

```
<KeySpecifier>
   <GUID>block-guid</GUID>
   <Index>number</Index>
</KeySpecifier>
```

If a stream is encrypted, a distribution point may start the stream with a 0x3902 metadata message, since the follow-on metadata and the stream data itself may be encrypted. Encryption keys may be changed in mid stream. If a subsequent 0x3902 metadata message arrives, it indicates that the frames that follow have been encrypted using the newly specified key.

In an implementation where metadata blocks are encrypted, the 0x3902 message is the first message sent by the broadcaster to the distribution point. Furthermore, the distribution point is configured to replace the saved 0x3902 with subsequent 0x3902 messages that are received.

Broadcaster Component to the Streaming Protocol

A service provider may use a broadcaster component to the streaming protocol to establish distribution of the stream on a distribution point. In particular, the broadcaster component enables a broadcaster to establish distribution of the stream on a distribution point. The broadcaster protocol may use a single message to establish a hosting of a stream on a distribution point. Using a single message to establish hosting of the stream may realize distribution point performance improvements, in part, because the distribution point need not coordinate between state information in different messages. In addition, response time may be improved, especially for narrowband listeners, since a single message exchange will take less time than a series of message exchanges.

For example, the distribution point may use a POST request to establish hosting of the stream on the distribution point. An exemplary POST request is shown below.

```
POST <path>[?BufferSize=<size>&MaxPayload=<bytes>&ListenerAuth=
<Y | N>]
   HTTP/1.1\r\n
Host: ultravox.aol.com\r\n
User-Agent: UvoxLive Ultravox Broadcaster 2.2\r\n
Expect: 100-continue\r\n
Ultravox-Protocol: 3.0\r\n
Ultravox-UID: <UID>\r\n
Ultravox-Auth-Token: <Authblob>\r\n
Ultravox-Auth-Profile: <AuthProfile>\r\n
Ultravox-Content-Type: <misc/ultravox>
Ultravox-Avg-Bitrate: <Avg Bit Rate>\r\n
Ultravox-Max-Bitrate: <Max Bit Rate>\r\n
Accept: */*\r\n
\r\n
```

The <path> may include a URL, and may be implementation dependent. For example, one such path may include http://ultravox.aol.com/stream/<SID>, where SID is the Radio Station ID, typically a number such as 8001. In some implementations, some of the header parameters may be required and some of the header parameters may be optional. In one implementation, Expect, User-Agent, Ultravox-Protocol, Ultravox-UID, Ultravox-Auth-Profile, Ultravox-Auth-Token, Ultravox-Content-Type, Ultravox-Avg-Bitrate, and Ultravox-Max-Bitrate are required header parameters while BufferSize, MaxPayload, and ListenerAuth are optional header parameters in the broadcaster component of a streaming protocol.

Description of the exemplary header parameters are included in the list below.

Expect: <100-continue>—indicates the distribution point should respond with a 100-continue message instead of a 200 OK.

User-Agent: <Broadcaster Name Version X.Y>—free form text the broadcaster supplies to identify itself. In some implementations, User-Agent may include "ultravox" somewhere in the text.

Ultravox-Protocol: <3.0>—The protocol version number (e.g., 3.0).

Ultravox-UID: <text>—The username/ID of the broadcaster.

Ultravox-Auth-Profile: An integer that identifies how the distribution point should authenticate the broadcaster.

Ultravox-Auth-Token: <depends on Auth-Profile>—The UID, Auth-Token, and Auth-Profile may be used in combination to perform authentication of the broadcaster. In one implementation, the AuthProfiles includes 1 for the USA, and 2 for a plaintext password. To obtain a USA AuthToken, a broadcaster authenticates to an Application Server configured to generate AuthTokens. The application server constructs an AuthToken for the Listener using a secret that is shared between the Application Server and the distribution point. AuthTokens may be URLEncoded.

Ultravox-Content-Type: <misc/ultravox>—The Ultravox-Content-Type parameter specifies to the distribution point that the data will be streaming protocol frames.

Ultravox-Avg-Bitrate: <number>—The Ultravox-Avg-Bitrate informs the distribution point what the average bitrate to expect from this broadcaster. Typically, the Avg-Bitrate should not exceed Max-Bitrate. The Avg-Bitrate may be used to allocate stream buffer sizes in the distribution point (bits per second).

Ultravox-Max-Bitrate: <number>—The Ultravox-Max-Bitrate informs the distribution point of the maximum bitrate to expect from the broadcaster (e.g., in bits per second).

BufferSize=<seconds>—The BufferSize parameter advises the distribution point to reserve seconds*bitrate/8 bytes for the listener ring buffer. In one implementation, BufferSize is advisory only, that is, the distribution point may decide to modify the BufferSize value or ignore BufferSize entirely.

MaxPayload=<bytes>—The MaxPayload parameter advises the distribution point that the broadcaster wishes to send messages of at most <bytes> long. In one implementation, the MaxPayload is advisory, particular in configurations where the distribution point is allowed to ultimately decide this value.

ListenerAuth=<Y/N>—The ListernetAuth paramete instructs the distribution point to override its default settings for listener authentication. For example, the ListenerAuth may either require (Y) or disable (N) authentication for a particular distribution point.

If the distribution point does not receive a complete HTTP POST request, or if the request does not contain a valid User-Agent header, the distribution point is simply disconnected. Otherwise, the distribution point responds to the request by sending the appropriate response as follows:

Summary of Exemplary Response Codes

TABLE 2

| Response | Description |
|---|---|
| HTTP/1.0 100 Continue | Stream is ready, distribution point is Responding with stream parameters. |
| HTTP/1.0 302 Redirect | Distribution point suggests the broadcaster connect to the supplied URL instead. The supplied URL is a base URL, and the broadcaster must append arguments itself |
| HTTP/1.0 400 Bad Request\r\n\r\n | Could not parse the request, or bad range on an argument |
| HTTP/1.0 403 Forbidden\r\n\r\n | Authentication is on, and this broadcaster was denied access. |
| HTTP/1.0 404 Not Found\r\n\r\n | Stream was not found in the distribution point's configuration |
| HTTP/1.0 503 Service Unavailable\r\n\r\n | Bandwidth limit reached on distribution point; broadcaster should try again later. |

When the distribution point responds with a proceed message, that is, a 100 Continue accepting the connection, the distribution point may be configured to respond to the request by sending the following exemplary response header:

```
HTTP/1.1 100 Continue\r\n
Server: Ultravox <protocol-version>\r\n
Ultravox-Buffer-Size: <seconds>\r\n
Ultravox-Max-Payload: <MaxPayload>\r\n
Ultravox-Max-Fragments: <number>\r\n
\r\n
```

When the Buffer-Size and Max-Payload arguments are advisory whose limits depend on the distribution point's internal resources and configuration, the distribution point may be configured to respond with the actual values used for the stream.

<protocol-version> is the protocol version (e.g., version 3.0).

<Ultravox-Buffer-Size> is number of seconds of buffer space the distribution point allocated for this stream.

<Ultravox-Max-Payload> is the maximum number of bytes the distribution point will accept in one frame from the broadcaster.

<Max-Fragments> is maximum number of metadata fragments that the distribution point will handle.

In addition, the following messages may be exchanged between the broadcaster and a distribution point. Note that in some implementations, the Class/Request: 0x1001, 0x1002, 0x1004, 0x1006, 0x1007, 0x1008 are reserved for older instances of the streaming protocol. Reserving the parameters for older instances of the protocol may preserve backwards compatibility.

Temporary Broadcast Interruption Message

A temporary broadcast interruption message may be used to inform a distribution point that a temporary interruption has occurred in the stream being distributed. An exemplary format for a temporary broadcast interruption message is shown below.

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    Sync Byte  |      Flags        |  Class  |     Request     |
| 1 0 1 1 0 1 0 | 0 0 0 0 0 0 0 0 0 | 0 0 0 1 | 0 0 0 0 0 0 0 0 0 1 0 0 1 |
+-+-+-+-+-+-+-+-+-+-+-+-+-+-+-+-+-+-+-+-+-+-+-+-+-+-+-+-+-+-+-+-+
|            Length             |    Payload    |      End      |
|              1                | 0 0 0 0 0 0 0 0 | 0 0 0 0 0 0 0 0 |
+-+-+-+-+-+-+-+-+-+-+-+-+-+-+-+-+-+-+-+-+-+-+-+-+-+-+-+-+-+-+-+-+
```

Class (4 bits) - 0x1
Request (12 bits) - 0x009
Length (16 bits) - 1.
Payload - 1 byte of null.

Broadcast Termination Message

A broadcaster may use a broadcast termination message to indicate that no more messages will be sent, and the connection will be closed. As a result, a distribution point may unsubscribe any listeners and terminate the stream, freeing its resources. In one implementation, the broadcast termination message has no payload. In the same or yet another implementation, if a broadcaster instead simply closes the TCP connection, the distribution point may be configured to interpret the closed TCP connection as an error. The error may result in messages being logged and waiting for the broadcaster to reconnect.

In one implementation, the payload may only consist of zero or more bytes of NULL, up to a maximum length of 127. After sending a broadcast termination message, the broadcaster may close the TCP connection. Because the broadcast termination message initiates an orderly termination, a broadcaster may be configured to transmit a broadcast termination message in the case of a normal termination of the broadcast.

termination message to listeners that are currently subscribed to the stream. The distribution point then closes the TCP connection (1) to the broadcaster; and (2) with remaining listener connections.

Flushed Cached Metadata Message

The flush cached metadata message is configured to cause the distribution point to empty all cached metadata that the distribution point may be holding for the stream. In one implementation, the flushed cached metadata message has no payload. An exemplary format for the flush cached metadata message is shown below.

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    Sync Byte  |      Flags        |  Class  |     Request     |
| 1 0 1 1 0 1 0 | 0 0 0 0 0 0 0 0 0 | 0 0 0 1 | 0 0 0 0 0 0 0 0 1 0 1 1 |
+-+-+-+-+-+-+-+-+-+-+-+-+-+-+-+-+-+-+-+-+-+-+-+-+-+-+-+-+-+-+-+-+
|            Length             |    Payload    |      End      |
|              1                | 0 0 0 0 0 0 0 0 | 0 0 0 0 0 0 0 0 |
+-+-+-+-+-+-+-+-+-+-+-+-+-+-+-+-+-+-+-+-+-+-+-+-+-+-+-+-+-+-+-+-+
```

Class (4 bits) - 0x1
Notice (12 bits) - 0x005
Length (16 bits) - 1
Payload - one byte of null.

Upon receiving the broadcast termination message, a distribution point may be configured to first send a broadcast

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    Sync Byte  |      Flags        |  Class  |     Request     |
| 1 0 1 1 0 1 0 | 0 0 0 0 0 0 0 0 0 | 0 0 0 1 | 0 0 0 0 0 0 0 0 1 1 0 |
+-+-+-+-+-+-+-+-+-+-+-+-+-+-+-+-+-+-+-+-+-+-+-+-+-+-+-+-+-+-+-+-+
|            Length             |    Payload    |      End      |
|              0                | 0 0 0 0 0 0 0 0 | 0 0 0 0 0 0 0 0 |
+-+-+-+-+-+-+-+-+-+-+-+-+-+-+-+-+-+-+-+-+-+-+-+-+-+-+-+-+-+-+-+-+
```

Class (4 bits) - 0x1
Notice (12 bits) - 0x006
Length (16 bits) - 1
Payload - 1 byte of null.

Upon receiving the flush cached metadata message, the distribution point empties all cached metadata currently stored for the stream. If the flush cached metadata message is received during a phase of the broadcast other than the data transfer phase, the flush cached metadata message may be ignored by the distribution point.

Metadata Messages (e.g., Classes 3-6)

The following exemplary format for metadata messages may be used.

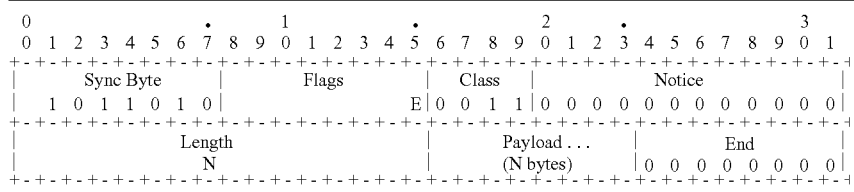

Class (4 bits) - 3-6
Notice (12 bits) - Metadata message type. The notice may be a number specific to the application.
Length (16 bits) - The length is the number of bytes of payload.
Metadata ID (16 bits) - The metadata ID is a broadcaster-defined tag identifying the metadata (required, binary, network byte order).
Metadata Total Fragments (16 bits) - The metadata total fragments represents the number of fragments in the package of metadata. The metadata total fragments typically is required, binary, and in network byte order. Note that in one implementation, MaxFragments sent back in the response header indicates the maximum number of total fragments that a distribution point can handle.
Metadata Fragment Index (16 bits) - The metadata fragment index identifies metadata fragment message in a sequence of indexed metadata fragments. This is typically required, binary, and network byte order.
Metadata Payload - The metadata payload is metadata information. The metadata payload may represent bytes and may be limited to MaxPayloadSize - 6.

A broadcaster uses one or more messages of the same type within this class to compose a complete metadata package to supply the listeners with information about the media currently being streamed.

There are two types of metadata messages—cacheable metadata, and pass-through metadata. Upon receiving a cacheable metadata message, a distribution point maintains a cache of the most recently received messages based on their type, plus a cache of the current messages located in the stream buffer. When new listeners establish connections with the stream, the cached metadata messages are transmitted to the new listener among the first data sent to that listener.

In addition, after receiving a metadata message, a distribution point may pass it on to existing listeners in band. For example, the metadata message may be pertinent to changes in the content of the broadcast media (e.g., the current song now playing).

If a metadata message is larger than the amount of data able to reside in a frame, the metadata message may be fragmented by the broadcaster into several frames. The fragmented metadata messages may include a metadata fragment index as well as a count of the total number of fragments in the metadata message. Metadata messages with a given ID may be considered to comprise a single package of metadata. Typically, metadata messages are only fragmented if the metadata messages are unable to reside within a single frame.

For a given class/notice parameter, if a distribution point receives a metadata message whose index is not already cached, the distribution point caches the metadata message. However, if the distribution point receives a metadata message whose class/notice value is already cached, the distribution point may be configured to remove all the cached metadata messages for the class/notice and then cache the new message.

The notice field of a metadata message is used to identify type of metadata for the listener. For instance, an Internet radio station uses 0x3901 (type=0x3 cacheable metadata, notice=0x901) messages to provide song metadata in XML format, while an Internet radio station uses another message number to indicate how many seconds are left in a particular song currently playing. The specific values of metadata messages and the resultant meaning and format may be service dependent.

The following exemplary metadata message classes may be used:

| | |
|---|---|
| 0x3000 | Content Information (Title . . . ) |
| 0x3001 | Information URL for current content |
| 0x3901 | Extended Content Information |
| 0x3902 | Encryption Key Information |
| 0x5001 | Time Remaining |

Data Messages (e.g., Classes 7-15)

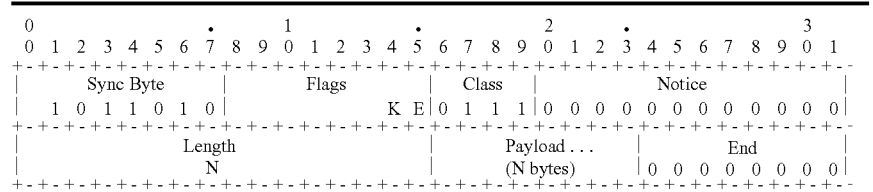

Class (4 bits) - 0x7-0x15
Notice (12 bits) - 0x0-0xfff
Length (16 bits) - length of the data payload
Payload - data, typically codec or file format data Messages of the data class may include the actual media being broadcast on the stream. Most often the data messages are used to pass codec data. The broadcaster may use the class/type fields to identify specific codecs. For instance, a 0x7000 (class=0x7, notice=0x0) message may represent an MP3 data message. An exemplary list of well-known data types follows.

| | |
|---|---|
| 0x7000 | MP3 |
| 0x7777 | NSV |
| 0x8000 | Dolby VLB |
| 0x8001 | Ogg |
| 0x8002 | Speex |

Broadcaster Message Flow

The broadcaster message flow describes a sample sequence of messages by which a broadcaster establishes, maintains, utilizes, and terminates a stream with the distribution point.

The broadcaster message flow sequence includes an exchange of messages between a broadcaster and distribution point, typically via a TCP connection, that is established by the broadcaster.

Once a TCP connection is established to a distribution point, the broadcaster sends a POST message, to which the distribution point may respond with a proceed message (e.g., a "100 Continue" message). The broadcaster transmits a stream of data frames until terminating the broadcast with a broadcast terminated message.

Table 2 (below) represents an exemplary conversation between a broadcaster and a distribution point during an error-free session establishment.

TABLE 3

| Broadcaster | Distribution Point |
|---|---|
| → POST/stream/1001 | |
| | ← 100 Continue |
| → 0x3901 CacheableMetadata:1:1:1:Song1 | |
| → 0x7000 DataMessage:<mp3 data> | |
| → 0x7000 DataMessage:<mp3 data> | |
| → 0x3901 CacheableMetadata:1:1:1:Song2 | |
| → 0x7000 DataMessage:<mp3 data> | |
| → 0x2005 BroadcastTermination | |
| | Close TCP Connection to broadcaster |

Listener Component to the Streaming Protocol

The following represent an exemplary request by which a listener may request the stream. To access a stream, the listener generates a GET request, typically including a URL, and a User-Agent specifier.

| |
|---|
| GET <path>?{<tuple>{&<tuple>}} HTTP/1.0\r\n |
| Host: ultravox.aol.com\r\n |
| User-Agent: (User Agent Info)\r\n |
| Ultravox-protocol: 3.0\r\n |
| Ultravox-transport-type: TCP\r\n |
| Accept: */*\r\n |
| [more implementation-dependent headers] |
| \r\n |

The <path> is a URL, and may be implementation dependent. Some examples include:
Radio @ AOL stream using a pseudo pathname: http://ultravox.aol.com/stream/<SID>, where SID is the Radio Station ID, typically a number such as 8001.
Video @ AOL stream with a path terminating at /uvox, where the cachefile argument describes the name of the stream being streamed: http://nsvod.aol.com/uvox?cachefile=/aol/artists/universal/50cent/50cent_detroit_show_dvd_350.nsv Typically, an application server is configured to generate a URL for a specified content selection. The listener may be configured to provide a mechanism for an end user to select an URL, which is then used to access a distribution point. Exemplary optional parameters that may be used include PrebufferTime, AuthToken, AuthProfile, start, and end. The exemplary optional parameters are described below.

PrebufferTime=<seconds>

In some implementations, a distribution point may be configured to provide streaming data output at the actual bitrate of the stream. In these implementations, the PrebufferTime tuple specifies an amount of data (for example, determined by the average bitrate multiplied by the prebuffer time in seconds) that is sent above bitrate to the listener immediately following the initial response. Sending an data above the bit rate enables the listener to start the streaming experience as quickly as possible. For example, transmitting an amount of data to the prebuffer of at least four times the standard bitrate may lead to a better listener experience. If the listener does not specify the prebuffer time, a distribution point may be configured to use its default configured prebuffer time. In one implementation, using a prebuffer time equivalent to 8 seconds represents a good default value.

AuthToken=<auth token>
AuthProfile=<profileID>

Authentication may be implemented using the AuthToken, and AuthProfile tuples. If the AuthToken is not specified, the distribution point may substitute an empty string when attempting to authenticate the listener. In one implementation, if AuthProfile is not specified, then USA authentication may be used to authenticate the listener.

To obtain a USA AuthToken, a listener typically authenticates itself to an application server configured to generate AuthTokens. The application server may be configured to construct an AuthToken for the Listener using a secret that is shared between the application server and the distribution point. AuthTokens may be URLEncoded to allow use as a value on a query string. More information can be found about AuthTokens by in the USA Specification.

A distribution point need not implement authentication. If authentication is not implemented, a distribution point ma be configured to ignore AuthToken, and AuthProfile arguments.

start=<hh:mm:ss>
end=<hh:mm:ss>

Seeking may implemented using start, while end is used for truncating playback before the end of the stream. Use of time codes are predicated upon distribution points being configured to enable access throughout the stream.

The start value informs the distribution point to start the streaming session at that offset. Note that for some content the start value is an approximation due to limitations of the encoding format. As a result, the distribution point may be configured to start streaming at the first complete data frame that is closest in time to the start time specified. The end value instructs the distribution point to stop streaming content when the stream reaches the end value. In one implementation, start and end values are absolute times while in another implementation, the start and end values are configured relative to the start of the stream.

Response Codes

If the distribution point does not receive a complete HTTP GET request, or if the request does not contain a valid User-Agent header, the listener may simply disconnect. Otherwise, the distribution point responds to the request by sending the appropriate response as follows:

Summary of Exemplary Response Codes

TABLE 4

| Response | Description |
| --- | --- |
| HTTP/1.0 200 Ok | Stream is ready, header and Data follows |
| HTTP/1.0 206 Partial Content | Seek request was processed properly, header and data follows |
| HTTP/1.0 302 Redirect | Distribution point does not have the stream, but it suggests the listener request it from the supplied URL. Listener must copy arguments. |
| HTTP/1.0 400 Bad Request\r\n\r\n | Could not parse the request, or bad range on an argument |
| HTTP/1.0 403 Forbidden\r\n\r\n | Authentication is on, and The listener was denied access. |
| HTTP/1.0 404 Not Found\r\n\r\n | Stream was not found, or stream is Not yet ready to stream. |
| HTTP/1.0 503 Service Unavailable\r\n\r\n | Bandwidth limit reached on distribution point; listener should try again later. |

Response Headers

When the distribution point responds with a proceed message (e.g., a 200 OK (or a 206 Partial Content for a Range Request)) accepting the connection, the distribution point may respond to the request by sending the following exemplary HTTP response header:

```
HTTP/1.0 200 OK\r\n
Server: Ultravox <protocol-version>\r\n
Content-Type: <Content-Type>\r\n
Ultravox-Avg-Bitrate: <Avg Bit Rate>\r\n
Ultravox-Max-Bitrate: <Max Bit Rate>\r\n
Ultravox-Max-Fragments: <Max Fragment Count>\r\n
\r\n
```

The exemplary response header may have the following semantic meaning:

<protocol-version> represents the protocol version (e.g., 3.0).

<Content-Type> represents the content type, such as audio/mp3, audio/*, video/*, etc.

<AvgBit Rate> represents the target bitrate for the stream (bits per second).

<Max Bit Rate> represents the maximum bitrate the stream will be sent at; for constant bitrate (CBR) stream, the average bitrate will be equal to the maximum bitrate. (bits per second).

<Max Fragment Count> represents the maximum number of metadata fragments that a given metadata message may contain.

<MaxMsgSize> represents the maximum message size that the distribution point will send.

Listener Messages

Temporary Broadcast Interruption Message

The distribution point may be configured to use a temporary broadcast interruption message to inform the Listener that a temporary interruption has occurred in the stream to which the listener is subscribed, and the distribution point is attempting to resolve this problem, for example, by switching to a backup stream, starting a backup stream, and/or taking other corrective action. The problem may be occurring because an upstream broadcaster has gone idle, or has disconnected without explicitly terminating the connection.

In one implementation, a listener may be configured to ignore payload information. An exemplary format for a temporary broadcast interruption is shown below.

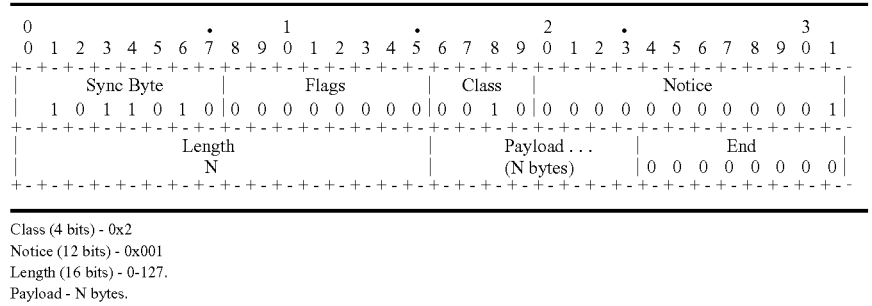

Class (4 bits) - 0x2
Notice (12 bits) - 0x001
Length (16 bits) - 0-127.
Payload - N bytes.

Broadcast Termination

The distribution point may use a broadcast termination message to inform the listener that the stream to which the listener is currently subscribed has terminated. For example, an upstream broadcaster may have explicitly terminated a stream, or a distribution point may have discovered a problem with an upstream broadcaster, and was unable to find a failover broadcaster within an implementation-defined period of time. After sending a broadcast termination message, the distribution point may close the TCP connection.

In one implementation, a listener may be configured to ignore payload information. An exemplary format for a broadcast termination is shown below.

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      Sync Byte       |        Flags       |    Class  |          Notice           |
|  1 0 1 1 0 1 0|0 0 0 0 0 0 0 0|0 0 1 0|0 0 0 0 0 0 0 0 0 0 1 0|
+-+-+-+-+-+-+-+-+-+-+-+-+-+-+-+-+-+-+-+-+-+-+-+-+-+-+-+-+-+-+-+-+
|             Length            |    Payload ...   |       End         |
|               N               |    (N bytes)     |0 0 0 0 0 0 0 0|
+-+-+-+-+-+-+-+-+-+-+-+-+-+-+-+-+-+-+-+-+-+-+-+-+-+-+-+-+-+-+-+-+
```

Class (4 bits) - 0x2
Notice (12 bits) - 0x002
Length (16 bits) - N
Payload - N bytes

Broadcast Failover

The distribution point uses the broadcast failover message to inform the listener that the stream to which the listener had been subscribed has failed and a backup stream has been substituted for it. The payload includes a colon-separated string that describes the attributes of the backup stream. Typically, the broadcast failover message is only used by distribution points that have the ability to perform stream failovers.

An exemplary format for a broadcast failover message is shown below.

The distribution point may be configured to send the broadcast discontinuity message when a listener experiences "underruns", or when the listener fails over to a stream with exactly the same stream definition (identical content, codec and bitrate) but from a different encoding source.

An exemplary format for a broadcast discontinuity message is shown below.

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      Sync Byte       |        Flags       |    Class  |          Notice           |
|  1 0 1 1 0 1 0|0 0 0 0 0 0 0 0|0 0 1 0|0 0 0 0 0 0 0 0 0 0 1 1|
+-+-+-+-+-+-+-+-+-+-+-+-+-+-+-+-+-+-+-+-+-+-+-+-+-+-+-+-+-+-+-+-+
|             Length            |    Payload ...   |       End         |
|               N               |    (N bytes)     |0 0 0 0 0 0 0 0|
+-+-+-+-+-+-+-+-+-+-+-+-+-+-+-+-+-+-+-+-+-+-+-+-+-+-+-+-+-+-+-+-+
```

Class (4 bits) - 0x2
Notice (12 bits) - 0x003
Length (16 bits) - length of the payload string.
Payload - string containing the HTTP response header for the new stream, including Server, Content-Type, Ultravox-Avg-Bitrate, Ultravox-Max-Bitrate, Ultravox-Max-Fragments.

The payload values identify the characteristics of the backup stream that was substituted for the failed stream and to which the listener is now subscribed.

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      Sync Byte       |        Flags       |    Class  |          Notice           |
|  1 0 1 1 0 1 0|0 0 0 0 0 0 0 0|0 0 1 0|0 0 0 0 0 0 0 0 0 1 0 0|
+-+-+-+-+-+-+-+-+-+-+-+-+-+-+-+-+-+-+-+-+-+-+-+-+-+-+-+-+-+-+-+-+
|             Length            |    Payload ...   |       End         |
|               N               |    (N bytes)     |0 0 0 0 0 0 0 0|
+-+-+-+-+-+-+-+-+-+-+-+-+-+-+-+-+-+-+-+-+-+-+-+-+-+-+-+-+-+-+-+-+
```

Class (4 bits) - 0x2
Notice (12 bits) - 0x004
Length (16 bits) - length of the payload string.
Payload - A listener may be configured to ignore the payload string.

Broadcast Discontinuity

The distribution point uses the broadcast discontinuity message to inform the listener that the stream to which the listener had been subscribed has lost messages. Listeners may use the broadcast discontinuity message to reset codecs or stop presentation until a new key frame is received, which may depend on particulars of the stream.

Metadata and Data Messages

Distribution points typically pass through data and metadata messages unchanged to the listener. Thus, the listener should be prepared to receive data and metadata messages as specified by the broadcaster component of the streaming protocol.

Other implementations are within the scope of the following claims. For example, although portions of the streaming protocol enable distribution of encrypted content, the streaming protocol also may be used to distribute unencrypted content.

What is claimed is:

1. A method for transmitting data to a client, the method comprising the following operations performed by at least one processor:
    receiving, at a distribution point, at least one portion of an encrypted stream of media, the encrypted stream associated with at least one first metadata message and at least one second metadata message;
    caching the at least one first metadata message;
    receiving a time-shift command from the client;
    identifying a portion of the encrypted stream of media content associated with the received time-shift command;
    if the identified portion includes a second metadata message, transmitting the at least one second metadata message;
    receiving another first metadata message;
    determining that a metadata ID corresponding to the another first metadata message matches a metadata ID corresponding to the at least one first metadata message;
    removing the cached at least one first metadata message; and
    caching the another first metadata message; and
    transmitting the identified specified portion of the encrypted stream of media content, an initialization vector associated with the identified portion, and the cached at least one first metadata message.

2. The method of claim 1, further comprising retrieving the initialization vector from a table of initialization vectors.

3. The method of claim 1, wherein the identified portion does not include the cached at least one first metadata message.

4. The method of claim 3, wherein the at least one first metadata message is contained in a portion of the encrypted stream preceding the identified portion.

5. The method of claim 1, wherein the cached at least one first metadata message includes the initialization vector.

6. The method of claim 5, wherein the cached at least one first metadata message further comprises content information associated with the encrypted stream of media.

7. The method of claim 1, further comprising:
    receiving a metadata message indicating that metadata should be flushed; and
    removing the cached at least one first metadata message.

8. A system for transmitting data to a client, the system comprising:
    at least one processor; and
    a storage device that stores instructions configured to, when executed by the at least one processor, cause the processor to perform the following operations:
        receive at least one portion of an encrypted stream of media, the encrypted stream associated with at least one first metadata message and at least one second metadata message;
        cache the at least one first metadata message;
        receive a time-shift command from the client;
        identify a portion of the encrypted stream of media content associated with the received time-shift command;
        if the identified portion includes a second metadata message, transmit the at least one second metadata message;
        receive another first metadata message;
        determine that a metadata ID corresponding to the another first metadata message matches a metadata ID corresponding to the at least one first metadata message;
        remove the cached at least one first metadata message; and
        cache the another first metadata message; and
        transmit the identified specified portion of the encrypted stream of media content, an initialization vector associated with the identified portion, and the cached at least one first metadata message.

9. The system of claim 8, wherein the instructions are further configured to cause the at least one processor to retrieve the initialization vector from a table of initialization vectors.

10. The system of claim 8, wherein the identified portion does not include the cached at least one first metadata message.

11. The system of claim 10, wherein the at least one first metadata message is contained in a portion of the encrypted stream preceding the identified portion.

12. The system of claim 8, wherein the cached at least one first metadata message comprises the initialization vector.

13. The system of claim 12, wherein the cached at least one first metadata message further comprises content information associated with the encrypted stream of media.

14. The system of claim 8, wherein the instructions are further configured to cause the at least one processor to:
    receive a metadata message indicating that metadata should be flushed; and
    remove the cached at least one first metadata message.

15. A computer-readable storage device comprising instructions that, when executed by at least one processor, causes the at least one processor to perform the following operations:
    receive at least one portion of an encrypted stream of media, the encrypted stream associated with at least one first metadata message and at least one second metadata message;
    cache the at least one first metadata message;
    receive a time-shift command from the client;
    identify a portion of the encrypted stream of media content associated with the received time-shift command;
    if the identified portion includes a second metadata message, transmit the at least one second metadata message;
    receive another first metadata message;
    determine that a metadata ID corresponding to the another first metadata message matches a metadata ID corresponding to the at least one first metadata message;
    remove the cached at least one first metadata message; and
    cache the another first metadata message; and
    transmit the identified specified portion of the encrypted stream of media content, an initialization vector associated with the identified portion, and the cached at least one first metadata message.

16. The storage device of claim 15, wherein the identified portion does not include the cached at least one first metadata message.

17. The storage device of claim 15, wherein the cached at least one first metadata message comprises the initialization vector and content information associated with the encrypted stream of media.

* * * * *